May 26, 1959
H. SAVARIEAU
2,888,294
DEVICES FOR FASTENING AND EJECTING AUXILIARY
APPARATUS ON AIRCRAFTS
Filed July 7, 1954
2 Sheets-Sheet 1
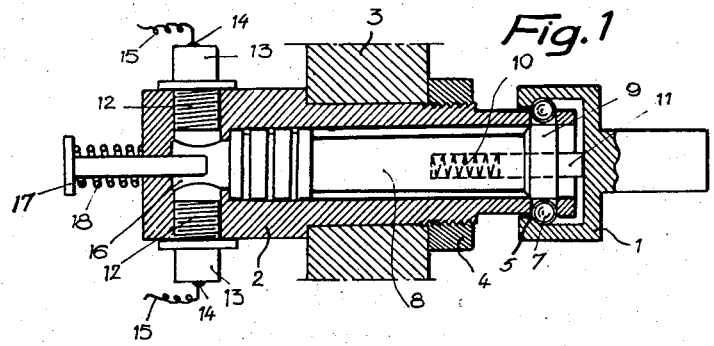
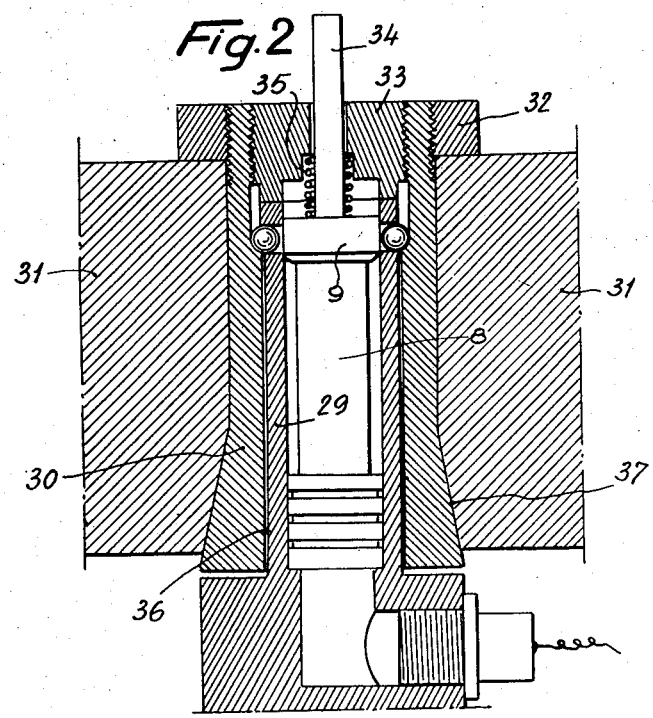
INVENTOR
HENRI SAVARIEAU
By Frederick L. Hays
ATTORNEY May 26, 1959

H. SAVARIEAU 2,888,294

DEVICES FOR FASTENING AND EJECTING AUXILIARY
APPARATUS ON AIRCRAFTS

Filed July 7, 1954

INVENTOR
HENRI SAVARIEAU

By Frederick E. Hane
ATTORNEY

United States Patent Office 2,888,294
Patented May 26, 1959

2,888,294

DEVICES FOR FASTENING AND EJECTING AUXILIARY APPARATUS ON AIRCRAFTS

Henri Savarieau, Valenton, France, assignor to Société Anonyme R. Alkan & Cie, Paris, France, a company Application July 7, 1954, Serial No. 441,787

Claims priority, application Great Britain July 7, 1953

7 Claims. (Cl. 294—83)

The present invention relates to jettison or like devices of the type employed on aircrafts for retaining and releasing under certain conditions auxiliary apparatus of miscellaneous description.

It is well known in aviation that certain auxiliary apparatus are positioned more or less externally of the main streamlined portions of the aircrafts, such as fuselage and wings; these apparatus, even if located inside auxiliary fairings, increase the drag and therefore provision must be made for jettisoning them during the flight when they have become useless or if their presence leads to serious dangers. Examples of these auxiliary apparatus are the devices usually mounted beneath or at the tips of the wings and intended to release rockets or the like, or to release or jettison bombs, reservoirs or containers.

In the case of aircrafts travelling at very high speeds, it is preferable not only to release these auxiliary apparatus but also to eject them with a force sufficient to prevent the released apparatus from contacting and deteriorating certain parts of the aircraft, notably the control-surfaces thereof.

Now it is the primary object of the present invention to provide a satisfactory solution to this problem by providing an explosive device whereby the release or jettisoning and ejection occur without permitting the combustion of the explosive powder to exert any destructive effect on the fixed portions of the aircraft from which the apparatus is to be released by ejection. The powder charge is ignited at the proper time by means of an electrical igniter. A mechanical or electric firing-pin may also be used for this purpose. The explosive device according to this invention, of which the features will be described presently, may also be replaced by a pneumatic device, and in this case compressed gas will be substituted for the gas pressure resulting from the combustion of the powder charge.

The essential feature of the device according to the present invention is that the mechanical connection between the portion to be released and the fixed portion, which is arranged inside a hollow member fast with one of said portions and open at one end, consists of an annular set of balls of which one portion projects from the outer periphery of the other portion; the inner faces of these balls bear against the head of a spring-loaded piston, and the combustion of a suitable explosive charge will move the piston toward the bottom of said hollow member, thereby allowing the balls to move inwardly and the device to be triggered, while providing the necessary impulsive force for the subsequent ejection.

According to a specific form of embodiment of the device, the piston is hollow and receives a holding spring acting on a push member extending through the piston head and bearing against the aforesaid hollow member; in this case the inner chamber of the piston is closed at its bottom to protect it from the gas pressure developed by the combustion of the powder which provides the desired ejection effect.

According to another complementary feature of the invention, the device broadly described hereinabove comprises in addition a manually operable release member intended to act upon the piston against the holding spring thereof, so that the detachable portion of the device can be removed without having to ignite the explosive means of the device. This release device may consist for example of a simple spring-loaded push member disposed beneath the piston, in axial alignment therewith, and projecting outside the device.

The attached drawings forming part of the application illustrate diagrammatically by way of example a few preferred embodiments of the invention. In the drawings:

Figure 1 is an axial section of one form of embodiment;

Figure 2 is another sectional axial view showing a different form of embodiment;

Figure 3:
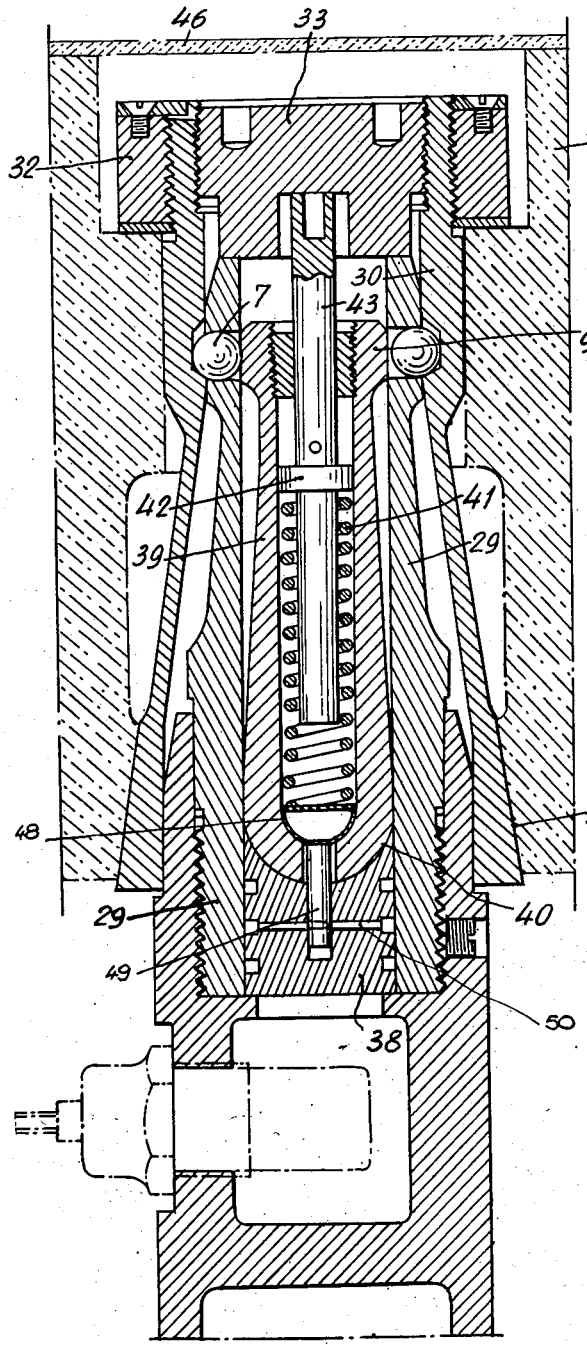
Figure 3 is a similar sectional view of a modification of the device shown in Figure 2.

In Figure 1, the part to be released is carried by a support 1 having a cup shaped portion facing inwardly. Support 1 coacts with a cylinder 2 secured to a structural flange 3 of the aircraft; for instance, it may extend through this structural flange and be held in position by an external nut 4.

Adjacent to the open side of member 1, an inwardly protruding shoulder 5 is provided which serves to retain the portion to be released through the medium of a releasable locking device, as explained herebelow.

The tubular cylinder 2 is dimensioned to fit within the fixed cup-shaped member 1; it has adjacent to its outer end a set of radial holes receiving locking balls 7. As clearly shown in the drawing, when the apparatus is ready to operate these balls project slightly from the outer surface of the tubular cylindrical body 2 and engage the shoulder 5.

The cylinder 2 has slidably mounted therein a locking piston or plunger 8 having on one end an enlarged head 9 adapted to keep the balls 7 in their radially-projecting locking position, and a narrower middle portion which, when moved into registry with these balls, enables the latter to slide toward the centre, as will be the case when the piston 8 is moved to the right according to Figure 1. To keep the piston 8 in its locked condition, a coil spring 10 is located within an axial bore of the piston and bears with one end against the bottom of this bore and with its other end against a retaining axial push-rod 11 extending through, and guided by, the head 9 of the piston so as to engage the bottom of the cup part of support 1.

At its far end relative to support 1 the cylinder 2 is provided with lateral pipe-connections 12 adapted to receive cartridges 13 containing a charge of explosive powder and an electrical igniter. Adjacent to these cartridges there are mounted lead-in caps 14 connected to sources of electric current through insulated conductors 15.

Externally of the piston a gas chamber 16 is formed in the cylinder 2 for receiving the gas developed by the combustion of the powder charge contained in the cartridges 13 and the pressure thus created in this chamber 16 is applied to the end face of piston 8 and pushes the latter at the proper time against the bottom of the support 1.

Beyond the chamber 16 the cylinder 2 also includes a manually operable push member 17 in axial alignment with the piston and serving to depress the piston against the resistance of a spring 18 and also of the piston holding spring 10.

The device so far described operates as follows. When the aircraft pilot desires to jettison the auxiliary apparatus supported by the cup-shaped body 1, for example a rocket-thrower, he operates a switch to supply current to the insulated conductors 15, the other terminal of the current supply being either grounded or connected to a return wire. As a result, the igniters of the cartridges 13 ignite the powder charge and the combustion gases developed within the chamber 16 generate such a pressure that the piston is forcibly pushed toward the bottom of the support, thereby permitting the balls 7 to recede into their radial holes under the impulse of the ejection force thus produced. The auxiliary apparatus and support 1 are thus released and at the same time they are ejected by the reaction or jet action of the gases and also by the piston 8 acting against the bottom of the support.

The efficiency of the ejection may be further increased through any adequate sealing device such as resilient rings, grooves, piston rings, etc.

The arrangement may also be designed to provide, in addition to the fastening and ejecting actions, a rigid guidance of the releasable part in the fixed support, so that the former will be balanced without any wedging. An arrangement of this type is shown in Figure 2 wherein the part to be released is fast with a cylinder 29 (similar to the cylinder 2 of Figure 1) whereas the fixed portion, corresponding to the support 1, consists of a tubular socket 30 fitted for example in a wing portion 31 to which it is fastened by means of a nut 32. On the inner side, the tubular socket 30 is provided with a cap 33. The piston rod 34 of the piston 8 extends through this cap 33 as shown.

A coil spring 35 engages this piston with one end and the cap 33 with its other end so as normally to urge the piston away from the cap. On its inner side, the tubular socket 30 has a bore 36 in which the cylinder 29 is sliding when it is ejected by the operation of the device. For securely fitting the tubular socket 30, the latter may be formed, at the end opposite to the nut 32, with a tapered surface 37 having its larger end at the outside, as shown.

The piston may also be made of two parts, one for sealing purposes and the other for connecting the portion to be ejected with the stationary portion. Such a device is shown on Figure 3 which comprises further a stronger fitting and a different arrangement of the coil spring, for which there is available a larger space in the embodiment of Fig. 3.

In this form of embodiment, parts 29 to 33 and 37 are substantially similar to the parts of Figure 2 having the same reference numbers. The piston however consists of two parts comprising a sealing part 38 and a locking part 39 which is able slightly to pivot with respect of part 38, due to the hemispherical surface joint 40. Thus, the piston will not be blocked due to transverse reactions of the apparatus which is released. Part 39 is hollow to receive a long coil spring 41 between its bottom and an annular flange 42 on the guiding rod 43 which abuts against cap 33 and extends within part 39.

The two parts 38—39 of the piston may be connected by a retaining member comprising a ball-shaped upper end 48 fitted in a correspondingly-shaped internal bottom surface of part 39 and a lower axial rod 49 extending through part 39 into part 38; a cotter pin 50 extends through a transverse bore of part 38 and rod 49, thereby assembling parts 38 and 39 so as to permit a slight tilting movement between the two parts.

Figure 4:
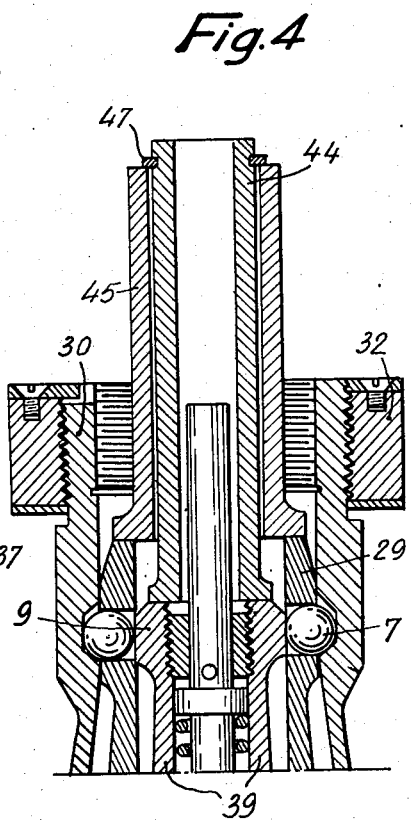
Figure 4 shows auxiliary means for testing the correct position of the components of which consists the device shown in Figure 3.

The device may comprise means for checking the correct relative position of members 29 and 39, as shown in Figure 4. This checking means comprises two coaxially slidable sleeves 44 and 45 introduced, before the mounting of cap 33, through an aperture of the wing portion 31, this aperture being normally closed by an external cover 46 (Figure 3). The sleeve 44 has a shoulder segment 47 against which sleeve 45 is just abutting the socket 45 when the two sleeves engage respectively the ends of parts 39 and 29, if these parts are in correct relative positions.

Thus, in response to the ignition of the explosive charge, the sealing part 38 of the piston is urged upwardly, as viewed in Figure 3, thereby also moving the locking part 39 against the action of the spring 41 to displace the head 9 from blocking relationship with the balls 7. This allows the balls 7 to retract, thus unlocking the cylinder 29 which is then ejected by the pressure of the ignited charge.

Of course, the specific embodiment described hereinabove and shown in the drawing is not restrictive and many constructional modifications may be made without departing from the spirit and scope of the invention. For instance, the locking balls may be replaced by non-spherical members or pawls.

What is claimed is:

1. A device for ejecting a part from an aircraft, said device comprising, in combination, a tubular cylindrical member, a support member for the part to be ejected slidably receiving one end of said cylindrical member, said members forming a cage therebetween, locking elements inserted in said cage movable between a locking position preventing relative axial movement of said cylindrical member and a release position releasing said cylindrical member for such relative axial movement, a plunger slidable in said cylindrical member, one end of said plunger facing toward one end of said support member for engagement therewith, said plunger being movable between a first position spaced from said one end of said support for retaining said locking elements in the locking position thereof and a second position in engagement with said one end of said support for releasing the locking element for movement into the release position, yieldable means biasing the plunger into said first position, means generating a propellant gas disposed opposite the other end of said plunger, actuation of said generating means propelling the plunger into its second position for engagement of the respective end of the plunger with said support member and forcibly ejecting said cylindrical member and the part supported thereon, means for activating said gas generating means, said plunger including a front part adjacent to the support member and a rear part forming a substantially gas tight seal between the plunger and the cylindrical member, and hinge means pivotally connecting said front part to said rear part for limited tiltable movement relative thereto and relative to the access of the cylindrical member.

2. A device for ejecting a part from an aircraft comprising, in combination, a tubular cylindrical member, a support member for the part to be ejected slidably receiving one end of said cylindrical member, said members forming a cage therebetween, locking elements inserted in said cage movable between a locking position preventing relative axial movement of said cylindrical member and a release position releasing said cylindrical member for such relative axial movement, a plunger slidable in said cylindrical member, one end of said plunger facing toward one end of said support member for engagement therewith, said plunger being movable between a first position spaced from said one end of said support for retaining said locking elements in the locking position thereof and a second position in engagement with said one end of said support for releasing the locking element for movement into the release position, yieldable means biasing the plunger into said first position, means generating a propellant gas disposed opposite the other end of said plunger, actuation of said generating means propelling the plunger into its second position for engagement of the respective end of the plunger with said support member and forcibly ejecting said cylindrical member and the part supported thereon, means for activating said gas generating means, checking means for checking the relative positions of the tubular member and plunger in which said plunger retains said locking elements in said locking position, said checking means including two coaxially slidable sleeves engageable with the respective ends of the cylindrical member and the plunger for axially displacing the cylindrical member and the plunger relative to each other, and locating means on one side of one sleeve engaging the other sleeve when the cylindrical member and the plunger are in a relative position retaining said locking elements in the locking position.

3. A device for ejecting a part from an aircraft comprising, in combination, a support member for the part to be ejected having a cylindrical sleeve bearing, a tubular cylindrical member, one end of said tubular cylindrical member having a cylindrical bearing member slidably received within said sleeve and terminating in an externally threaded portion, a nut threadedly engaged upon said externally threaded portion of said tubular cylindrical member carried upon said support member, the opposite end of said tubular cylindrical member defining an exterior truncated conical bearing surface, and said support member having an interior truncated conical bearing surface in abutment with said exterior truncated conical bearing surface of said cylindrical member, said nut drawing said cylindrical bearing member of said tubular member through said cylindrical bearing to maintain said truncated conical bearing surface of said tubular cylindrical member in bearing engagement with said interior truncated conical bearing surface of said support member.

4. A device for ejecting a part from an aircraft as set forth in claim 3, wherein said tubular cylindrical member comprises a multipart plunger having a first part and a second part, and pivot bearing means acting between said first and second parts accommodating limited angular movement therebetween.

5. The device according to claim 1, wherein said front part and said rear part of the plunger have abutting semi-spherical surfaces in engagement with each other.

6. The device according to claim 5, wherein said support member includes a cup shaped portion carried by said tubular cylindrical member, the hollow side of said cup shaped portion facing said one end of said plunger.

7. The device according to claim 2 wherein said support member has a central opening therethrough to provide for passage of said checking sleeves, and wherein a closure cap is provided for closing said opening upon completion of the checking operation.

References Cited in the file of this patent

UNITED STATES PATENTS

| | | |
|---|---|---|
| 2,413,450 | Johnsen | Dec. 31, 1946 |
| 2,435,444 | Johnsen | Feb. 3, 1948 |
| 2,489,984 | Shoemaker | Nov. 29, 1949 |
| 2,562,459 | Hoey | July 31, 1951 |
| 2,616,369 | Brown | Nov. 4, 1952 |
| 2,616,748 | Hight | Nov. 4, 1952 |
| 2,650,127 | Carlson | Aug. 25, 1953 |
| 2,726,576 | Musser | Dec. 13, 1955 |
| 2,750,842 | Myers | June 19, 1956 |

FOREIGN PATENTS

| | | |
|---|---|---|
| 979,155 | France | Dec. 1, 1948 |